United States Patent [19]

Szepesi

[11] Patent Number: 4,975,820
[45] Date of Patent: Dec. 4, 1990

[54] ADAPTIVE COMPENSATING RAMP GENERATOR FOR CURRENT-MODE DC/DC CONVERTERS

[75] Inventor: Tamas S. Szepesi, San Jose, Calif.
[73] Assignee: National Semiconductor Corporation, Santa Clara, Calif.
[21] Appl. No.: 402,125
[22] Filed: Sep. 1, 1989
[51] Int. Cl.$^5$ .......................................... H02M 3/335
[52] U.S. Cl. .................................... 363/21; 323/282; 323/285; 363/79; 363/97
[58] Field of Search ................... 323/282, 285, 288; 363/15, 21, 79, 97, 131

[56] References Cited

U.S. PATENT DOCUMENTS

| 4,672,518 | 6/1987 | Murdock | 323/285 |
| 4,674,020 | 6/1987 | Hill | 323/288 |
| 4,717,994 | 1/1988 | Diaz et al. | 363/21 |
| 4,837,495 | 6/1989 | Zansky | 323/285 |

Primary Examiner—Steven L. Stephan
Assistant Examiner—J. Sterrett
Attorney, Agent, or Firm—Limbach, Limbach & Sutton

[57] ABSTRACT

A circuit (20, 40, 50, 60) for generating an optimal compensating ramp voltage signal $V_{cramp}$, with the minimum necessary slope, $m_c$ for a current mode DC/DC converter is shown. The adaptive compensating ramp generating circuit (20) is comprised of two voltage dividers (22, 24), the first voltage divider 22 divides an input voltage $V_{IN}$ and the second voltage divider 24 divides an output voltage $V_{OUT}$. The first voltage divider (22) has two resistors (26, 28) in series: the first resistor (26) has a resistance of $(1/B-1) * R$ ohms and the second resistor (28) has a resistance of R ohms. $V_{OUT}$ is divided by the second voltage divider (24) having two resistors (29, 30) in series: the first resistor (29) has a resistance of $(1/A-1) * R$ ohms and the second resistor (30) has a resistance of R ohms. The constants A, B, and C are selected for the particular type of DC/DC converter employed. The divided voltages $A * V_{OUT}$ and $B * V_{IN}$ are input into a voltage controlled current source (32). The voltage controlled current source (32) has a scaling resistor $R_{scale}$, an amplifier (36), a transistor Q, and a diode D1. The output of the current source (38) is coupled to a capacitor $C_{ramp}$ whose voltage realizes the slope of the compensating ramp signal, $V_{cramp}$. The capacitor $C_{ramp}$ is charged through $R_{scale}$.

42 Claims, 9 Drawing Sheets

ADAPTIVE COMPENSATING RAMP GENERATOR FOR CURRENT-MODE DC/DC CONVERTERS

TECHNICAL FIELD

The present invention relates to a compensating ramp and more particularly the invention relates to an adaptive compensating ramp generator for current mode DC to DC converters.

BACKGROUND OF THE INVENTION

A compensating ramp changes the slope at which a reference voltage intersects with the current sense voltage signal. Conventional current-mode controlled DC to DC (DC/DC) converters operating above 50% duty cycle need a compensating ramp signal superimposed on a current sense signal, which is used as a control parameter, to avoid "open loop instability" or "subharmonic oscillation".

To avoid subharmonic oscillation, the slope of the current sense voltage during ON time ($m_{up}$) must be greater than the reflected slope ($m_{do}$), where the reflected slope is the change between the ending amplitude of the current sense voltage and its starting amplitude at the beginning of the next cycle, divided by the OFF time. $m_{up}$ is usually less than $m_{do}$ for a >50% duty cycle. Therefore, to make $m_{up}$ greater than $m_{do}$, a ramp signal having additional slope is superimposed onto the current sense signal.

In the past, the compensating ramp signal was formed by scaling the system's oscillator timing signal and adding it to the current sense voltage or deducting it from the error amplifier's output voltage. The necessary slope of the compensating ramp signal is dependent upon the input and output voltage of the DC/DC converter and the value of the inductor used. In transformer coupled systems, the necessary slope is also dependent upon the transformer's turn ratio.

Traditional systems set the ramp signal's slope to accommodate for the worst case conditions: maximum output voltage (in variable output voltage systems only) and minimum input voltage. By designing the slope to accommodate for the worst case situation, under normal operating conditions, the slope and accordingly the amplitude of the ramp is higher than necessary. For example, in wide input range systems, the amplitude is often two to three times higher than necessary for stability.

There are two primary disadvantages associated with having a compensating ramp signal with excessive slope. First, the maximum available output current of the system is limited; the steeper the slope, the lower the amount of current available at current limit. Second, the phase margin of the amplitude control loop is decreased.

SUMMARY OF THE INVENTION

The present invention provides a circuit for generating a compensating ramp signal in a switching regulator of the type which is responsive to an unregulated input voltage ($V_{in}$) and which provides a regulated output voltage ($V_{out}$). The circuit includes a sense resistor ($R_s$) which provides a signal proportional to the current flowing through the switch; means for storing energy having an inductance (L); and means for amplifying having a predetermined gain ($A_I$) to amplify the signal from the sense resistor. The signal from the sense resistor is used to control the operation of the switching regulator.

The compensating ramp circuit comprises means for generating a compensating ramp voltage signal having a slope ($m_c$) which conforms to the equation $$m_c > (A*V_{OUT} - B*V_{IN})*C$$

where $A \leq 1$, $B \leq 1$, and C is a constant dependent upon $R_S$, L, and magnetic coupling parameters associated with the energy storage means. The circuit includes means for superimposing the generated compensating ramp voltage onto the signal from the sense resistor such that the stability of the switching regulator is ensured.

Parameters A, B, C are selected according to the type of switching regulator. The means for generating the compensating ramp having the slope $m_c$, in the preferred embodiment, may include means responsive to the output voltage for providing a first signal which is equal to the output voltage divided by a first preselected amount, means responsive to the input voltage for providing a second signal which is equal to the input voltage divided by a second preselected amount, and means for generating a signal proportional to the difference between the first and second signals.

A primary object of the present invention is to optimize the amplitude and slope of a compensating ramp signal to have the maximum available current available at current limit.

Another object of the present invention is to provide an adaptive compensating ramp generator having one external scaling resistor to generate the necessary ramp over the entire input/output voltage range of a DC/DC converter and frequency range, in adjustable frequency systems.

Another object of the present invention is to employ an internal fixed scaling resistor in a fixed frequency system with a limited range of applicable inductors.

These, and further objects and advantages of the present invention will be made clear or will become apparent during the course of the following description of the preferred embodiment of the present invention.

BRIEF DESCRIPTION OF THE PREFERRED EMBODIMENTS

Figure 6A:
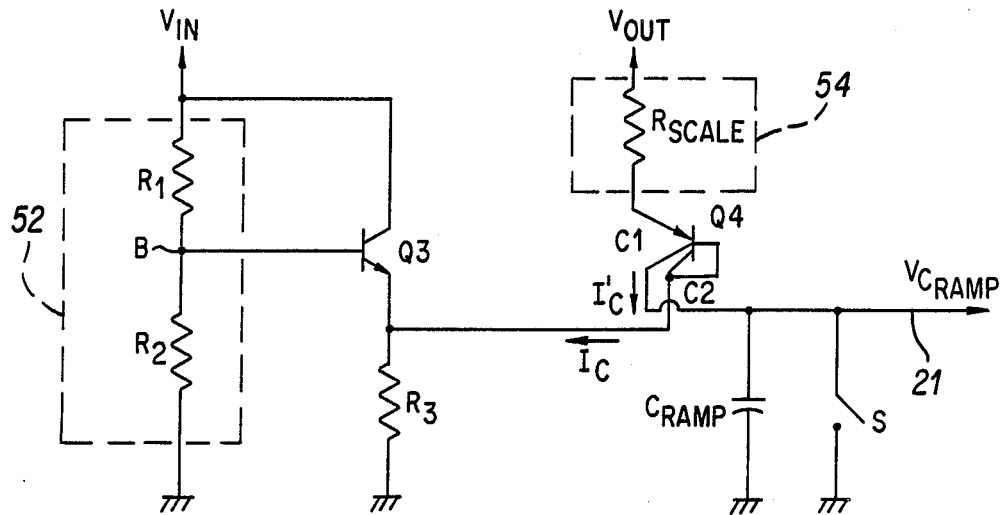
Figure 10:
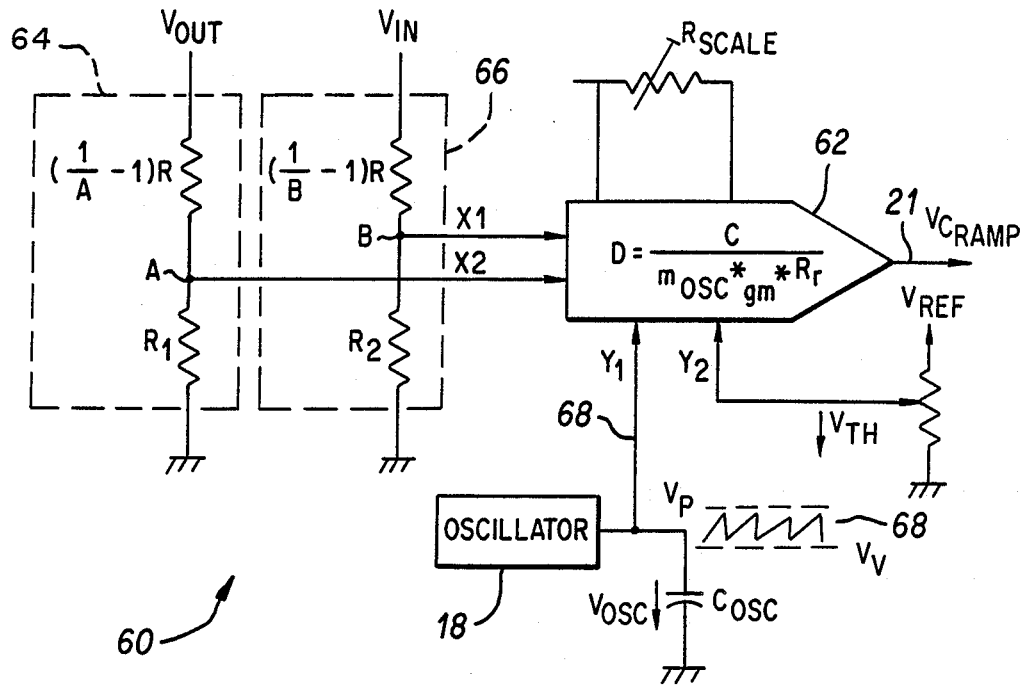
Figure 6B:
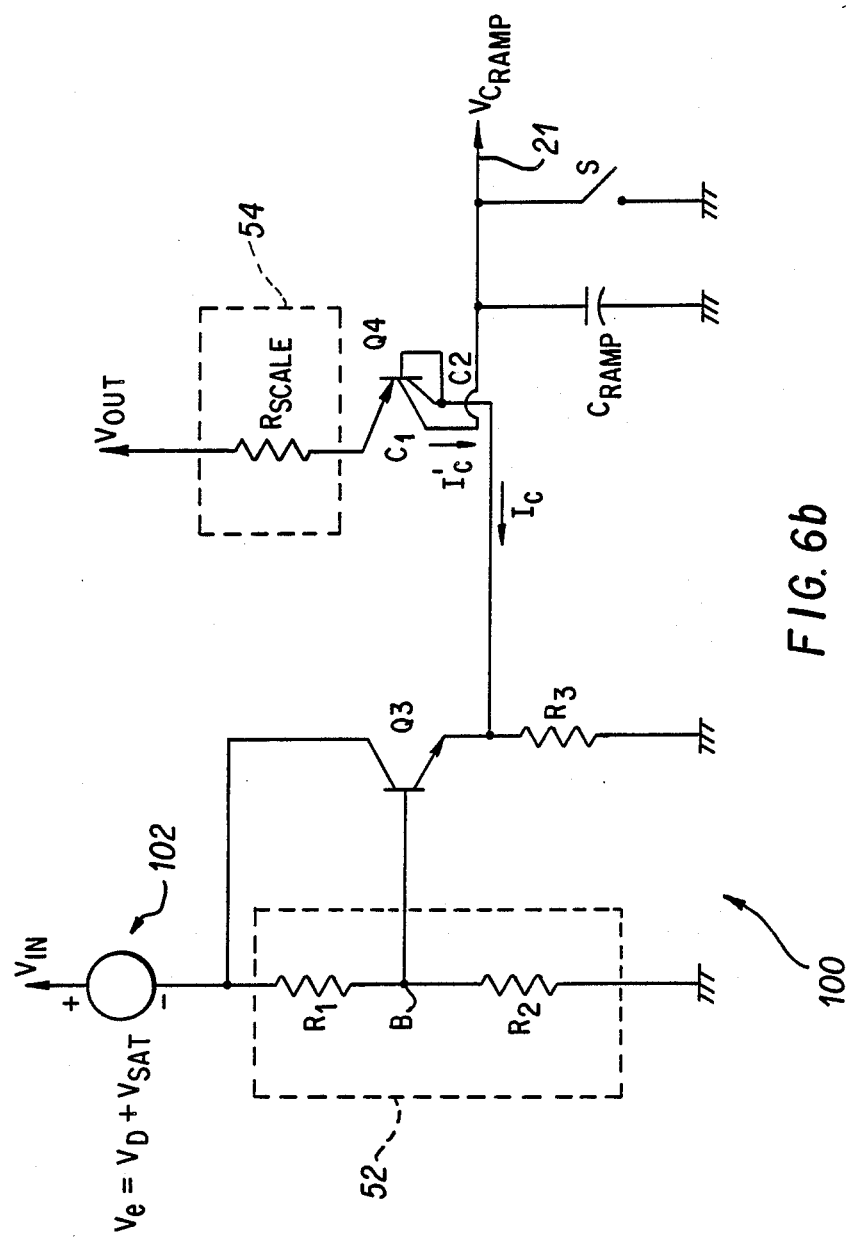
Figure 7:
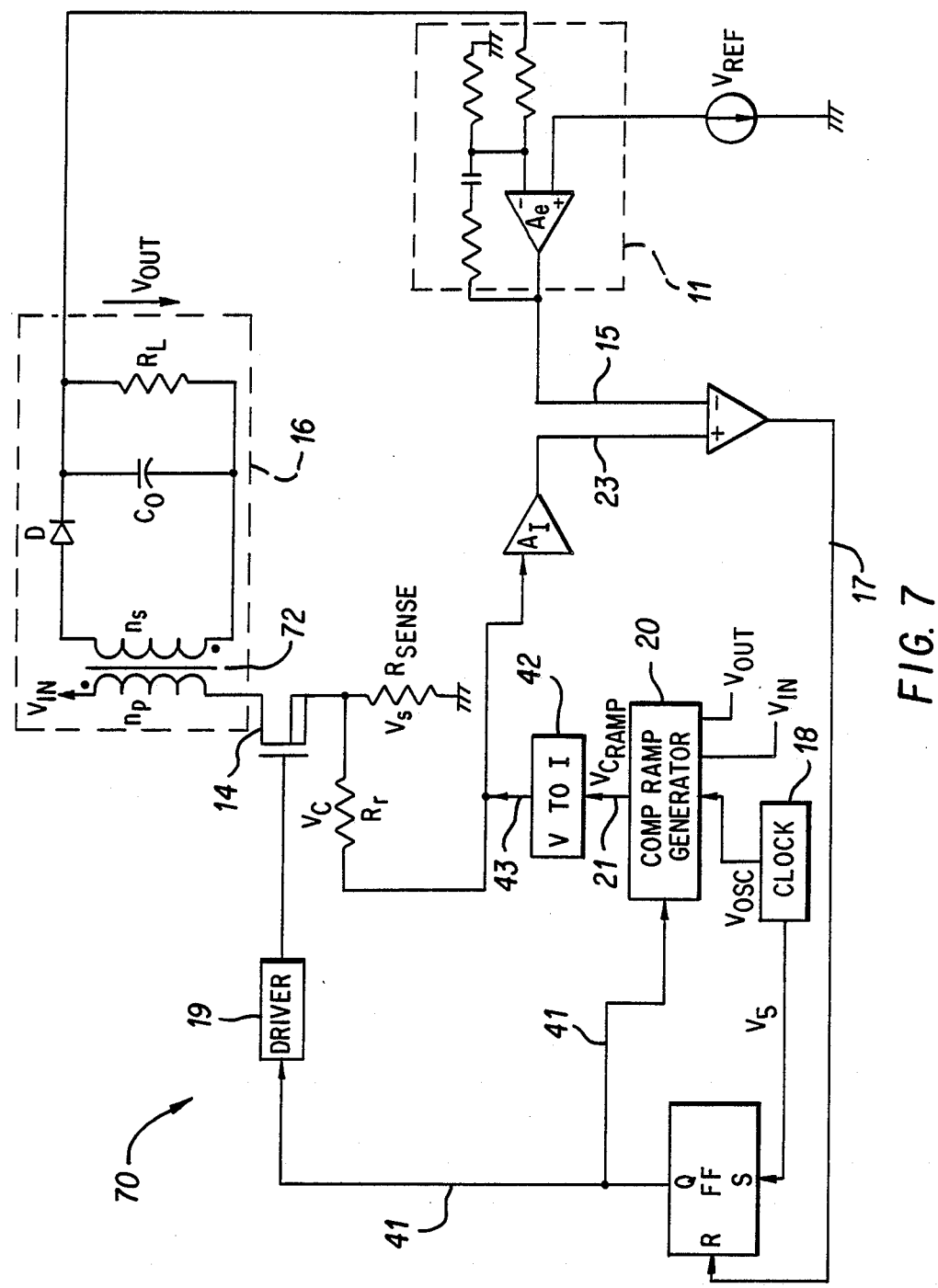
Figure 8:
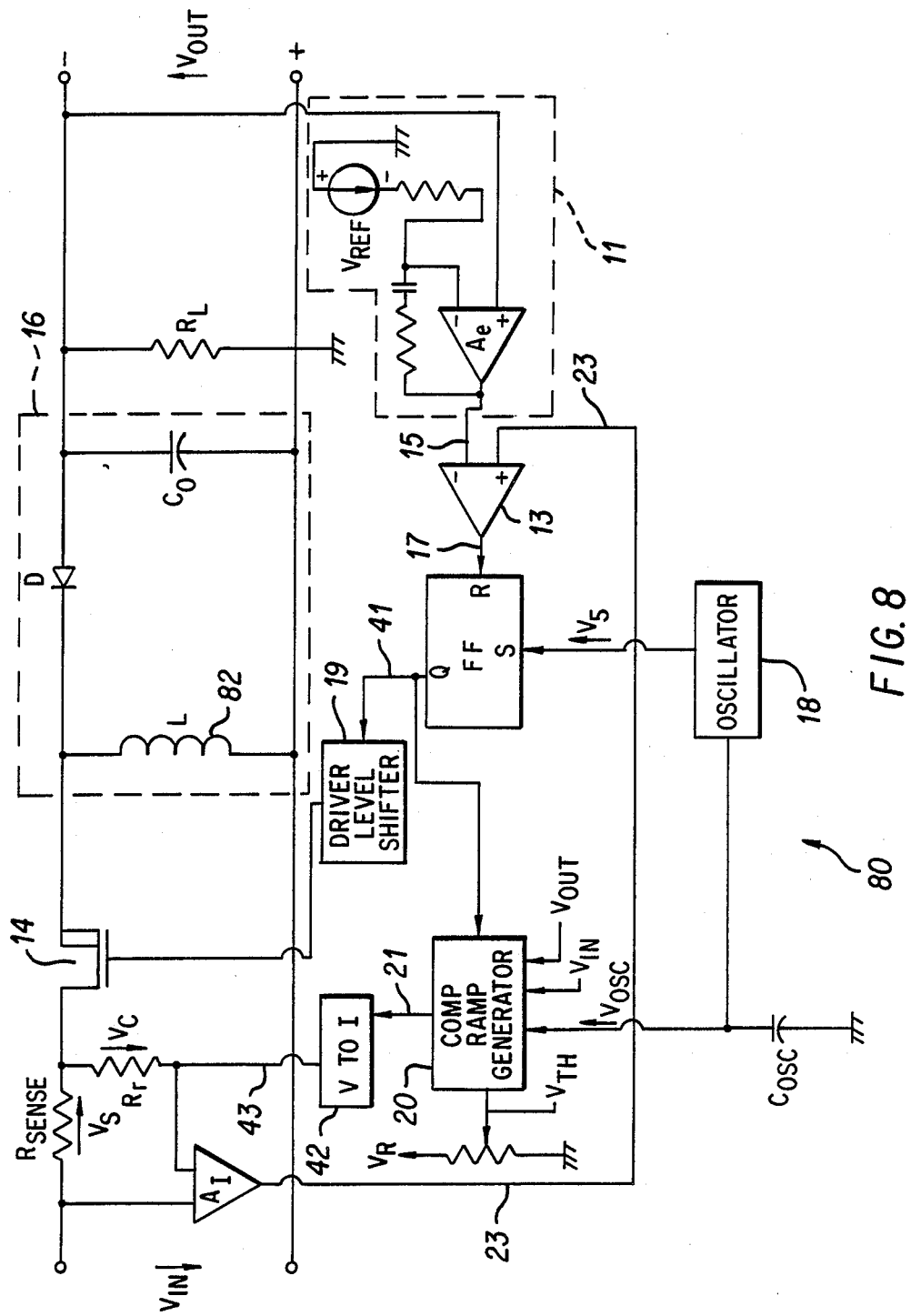
Figure 9:
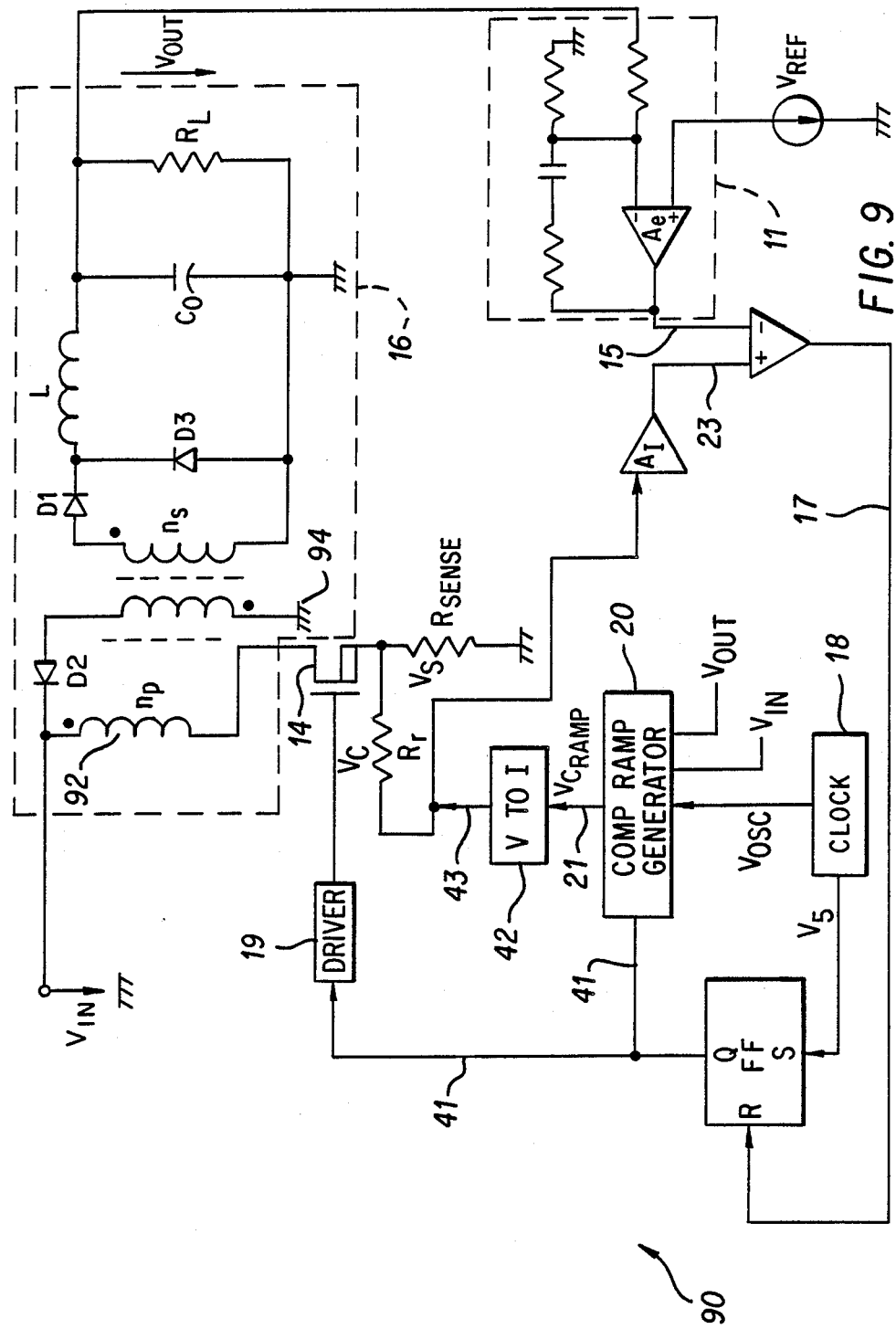

FIG. 6a" is a circuit diagram of another ramp generator of the present invention for a DC/DC buck converter;

FIG. 6b is a circuit diagram of another DC/DC buck converter, similar to FIG. 6a, showing an error voltage source;

FIG. 7 is a block diagram of a DC/DC fly-back converter having a ramp generator of the present invention;

FIG. 8 is a block diagram of a DC/DC buck-boost converter having a ramp generator of the present invention;

FIG. 9 is a block diagram of a DC/DC forward converter having a ramp generator of the present invention; and FIG. 10 is a circuit diagram of still another ramp generator of the present invention.

DETAILED DESCRIPTION OF THE PREFERRED EMBODIMENTS

Figure 1:
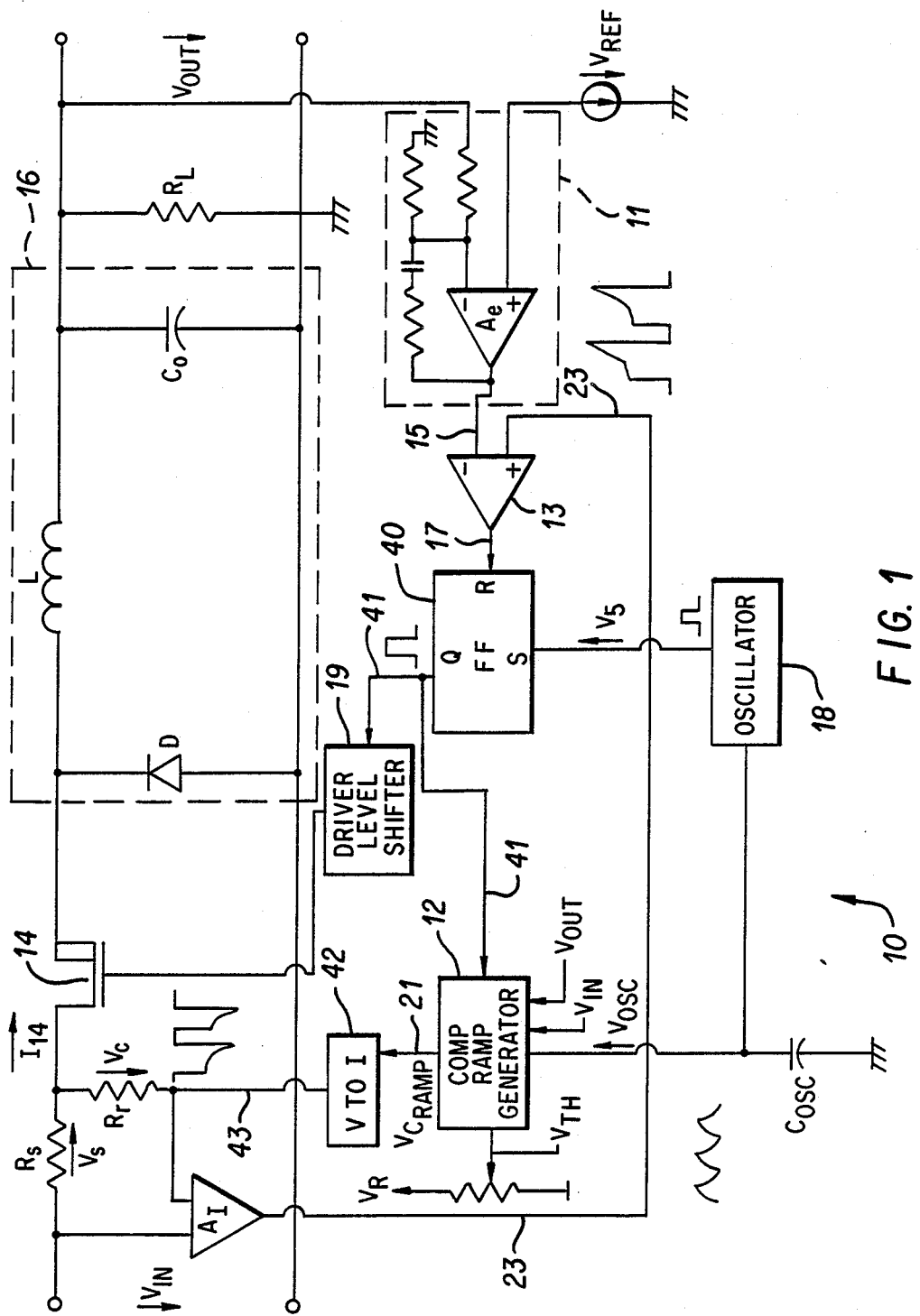
FIG. 1 is a functional block diagram of a conventional buck DC to DC converter having a compensating ramp generator.

Referring to FIGS. 1 and 2, FIG. 1 is a functional block diagram of a current mode buck (or step down) DC to DC (DC/DC) converter 10 operating at above a 50% duty cycle and having a compensating ramp generator 12. FIG. 2 is the timing diagram corresponding to the circuit 10 in FIG. 1. FIG. 2c illustrates the slope $m_{up}$ and the reflected slope $m_{do}$ of the current sense signal through $R_s$ having voltage $V_s$. A DC/DC converter converts one signal having a particular DC level to another DC level. The buck converter 10 includes a power switch 14 which may be a field effect transistor (FET); a sense resistor $R_s$ connected between an input voltage source $V_{in}$ and the power switch 14; a ramp scaling resistor $R_r$ connected between the resistor $R_s$ and the switch 14 where voltage $V_c$ is the voltage drop across $R_r$ and $V_{in}$ has a slope of $m_c$; a current amplifier $A_1$ which has $V_{in}$ and voltage $V_c$ as its inputs; and filtering components 16 which are connected between the power switch 14 and a load $R_L$. The filtering components 16 include a capacitor $C_o$, an inductor L, and a diode D. The output voltage $V_{OUT}$ is provided at one of the inputs to an error amplifier 11. The error amplifier 11 is comprised of an amplifier $A_e$ which compares $V_{OUT}$ with a reference voltage $V_{ref}$.

The current through the power switch 14 $I_{14}$ (FIG. 2b) is sensed by resistor $R_s$. The sensed current is used to turn the power switch 14 OFF. Resistor $R_r$ scales the compensating ramp voltage $V_c$ having a slope of $m_c$, and is much greater than sense resistor $R_s$ ($R_r >> R_s$).

Figure 2A:
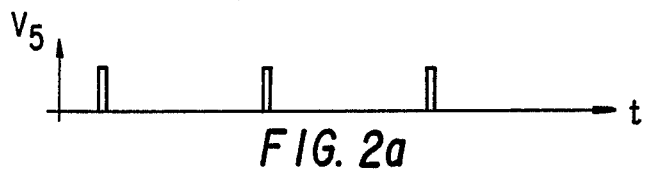
FIG. 2 is a timing diagram corresponding to the circuit of FIG. 1.
Figure 2B:
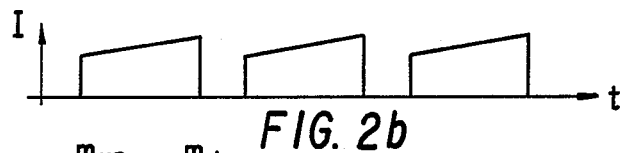
Figure 2C:
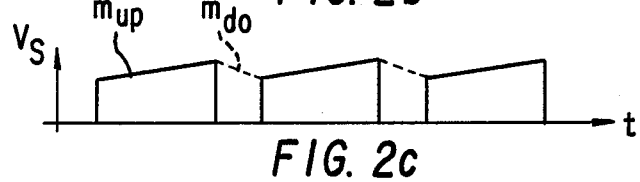
Figure 2D:
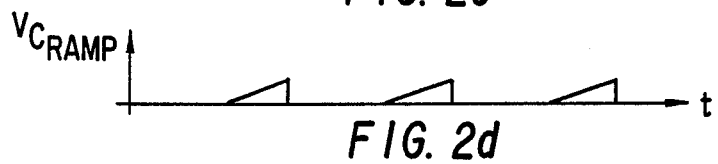
Figure 2E:
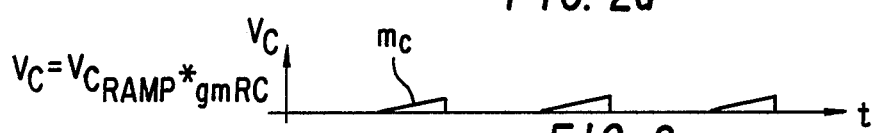

The system clock 18 or oscillator provides a clock pulse $V_5$ (FIG. 2a) to the main flip-flop FF 40 and turns on the switch 14 in each period. As illustrated in FIGS. 2a, 2b and 2c, the clock pulse $V_5$ turns on the switch 14 causing current to flow through the switch $I_{14}$ and resistor $R_s$. The voltage $V_s$ wave form and power current waveform mirror one another.

The compensating ramp generator 12 also receives the system clock 18 timing signal, $V_{osc}$, and voltages $V_{in}$ and $V_{OUT}$. The compensating ramp generator 12 generates a compensating ramp signal 21 having a voltage $V_{cramp}$ (FIG. 2d) and a slope of $$m_{21} = \frac{m_c}{g_m * R_r}$$

where $g_m$ is the transconductance of a voltage to current converter 42. $V_{TH}$, a threshold voltage, adjusts the starting instant of the ramp signal 21 and the voltage to current converter 42 level shifts the compensating ramp signal 21 up to the voltage level of the input signal $V_{in}$ and generates a level shifted compensating ramp signal 43.

The voltage of the level shifted compensating ramp signal 43 is $V_c$. $V_c$ is the voltage drop across the ramp scaling resistor $R_r$. The compensating ramp generator 12 may also use $V_{IN}$, $V_{OUT}$, $V_{OSC}$, the output signal of the flip-flop 40 and a DC threshold voltage $V_{th}$ to generate the compensating ramp signal 21, depending on the construction of the compensating ramp generator circuit 12 employed.

Figure 2F:
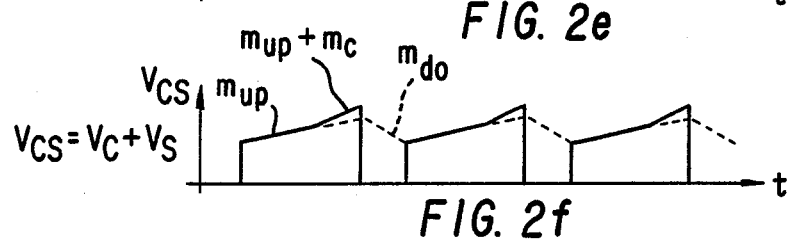
Figure 2G:
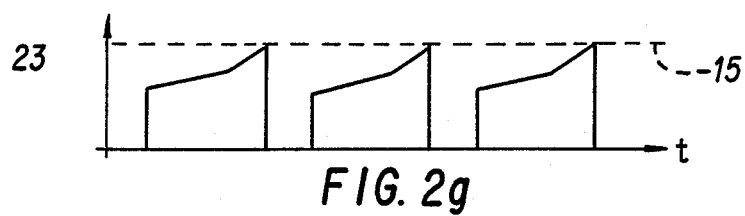

The output signal 15 of the error amplifier 11 is input to a comparator 13 where it is compared with the amplified signal 23 (FIG. 2g). The amplified signal 23 is the amplified sum $V_c + V_s$ of the switch current sense voltage $V_s$ and $V_c$ (FIG. 2f). When the modified current sense signal 23 is equivalent to the output signal 15 out of the error amplifier 11, comparator 13 outputs a comparison signal 17 (FIG. 2h) when the current sense signal 23 is equivalent to the output signal 15. The comparison signal 17 is input to flip flop 40 and resets the flip-flop 40.

Figure 2H:
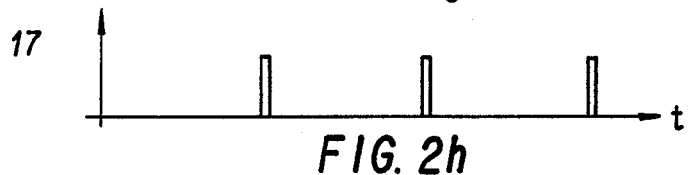
Figure 2I:
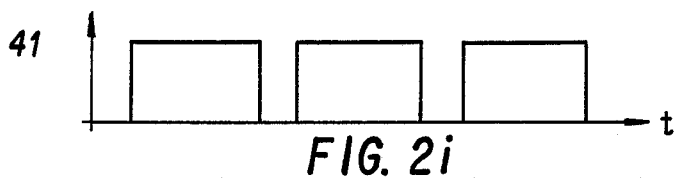

The flip flop 40 outputs a driver control signal 40 (FIG. 2i) which turns off the switch 16 through driver 19. Referring in particular to FIGS. 2h and 2i, when the comparison signal 17 is high, the signal 41 out of the flip flop 41 goes low and the switch 14 is turned OFF. The flip flop output signal 41 remains low until the next clock pulse $V_5$ is received. The maximum available output voltage of the error amplifier 11 thereby limits the available maximum current from the switch 14 (i.e., the maximum available voltage limit acts as a current limit). In most systems, the error amplifier's maximum output voltage is internally limited to set the current limit to the desired value.

The condition for stability of a conventional DC/DC converter's power stage is:

$$m_c \geq m_{do} - m_{up} \qquad 1.$$

where $m_c$ = slope of the level shifted compensating ramp voltage signal $V_c$ $m_{up}$ = slope of the current sense voltages $V_s$ during ON-time $m_{do}$ = reflected slope (i.e., the change in amplitude between the ending amplitude of the current sense voltage during an ON-time cycle and the starting amplitude of the current sense voltage at the beginning of the next ON-time cycle, divided by the OFF time.)

For a buck DC/DC current-mode converter the slopes of $m_{up}$ and $m_{do}$ of Equation (Eq.) 1 are defined as follows:

$$m_{up} = \frac{V_{IN} - V_{OUT} - V_{SAT}}{L} * R_s \qquad 2$$

and $$m_{do} = \frac{V_{OUT} + V_D}{L} * R_s \qquad 3$$

where $V_{SAT}$ is the power FET saturation voltage, and $V_D$ is the forward biased diode voltage.

Using Eq. 1, the condition for stability of the compensating ramp's slope is:

$$m_c \geq m_{do} - m_{up} = \frac{2R_s}{L}\left(V_{OUT} - \frac{V_{IN}}{2} + \frac{V_D + V_{SAT}}{2}\right) \qquad 4$$

In systems with high efficiency, $V_D$ and $V_{SAT}$ are $<< V_{OUT}$ and $<< V_{IN}$, and therefore, $V_D$ and $V_{SAT}$ can be neglected. Therefore, $m_c$ becomes:

$$m_c > (A*V_{OUT} - B*V_{IN})*C \text{ where } A \leq 1 \qquad 5.$$

$B \leq 1$

C = a constant which is dependent upon the $R_s$, L, n ($n = n_s/n_p$ the turns ratio of any transformer employed) and $L_p$ (primary inductance of any transformer employed in the switching circuit.)

The minimum necessary slope of the level shifted compensating ramp signal 43 (FIG. 1), for most types of current-mode-controlled DC/DC converters, can be expressed in the format of Equation 5. In particular, for a buck converter, a boost converter, a flyback converter, a forward converter, and a buckboost converter, the preferred parameters for Equation 5 are summarized below:

TABLE 1

| DC/DC Converter | | A | B | C |
|---|---|---|---|---|
| Buck | | 1 | $\leq .5$ | $2R_s/L$ |
| Boost | | $\geq .5$ | 1 | $2R_2/L$ |
| Flyback | $n \geq 1$ | $\geq 1/n$ | 1 | $R_s/L_p$ |
| | $n < 1$ | 1 | $\leq n$ | $R_s/nL_p$ |
| Forward | $n \geq 2$ | $\geq 2/n$ | 1 | $n^2 R_s/L$ |
| | $n < 2$ | 1 | $\leq n/2$ | $2nR_s/L$ |
| Buck-Boost | | 1 | $\leq 1$ | $R_s/L$ |

The compensating ramp slope $m_c$ is meaningful only if it is positive or 0.

Figure 3:
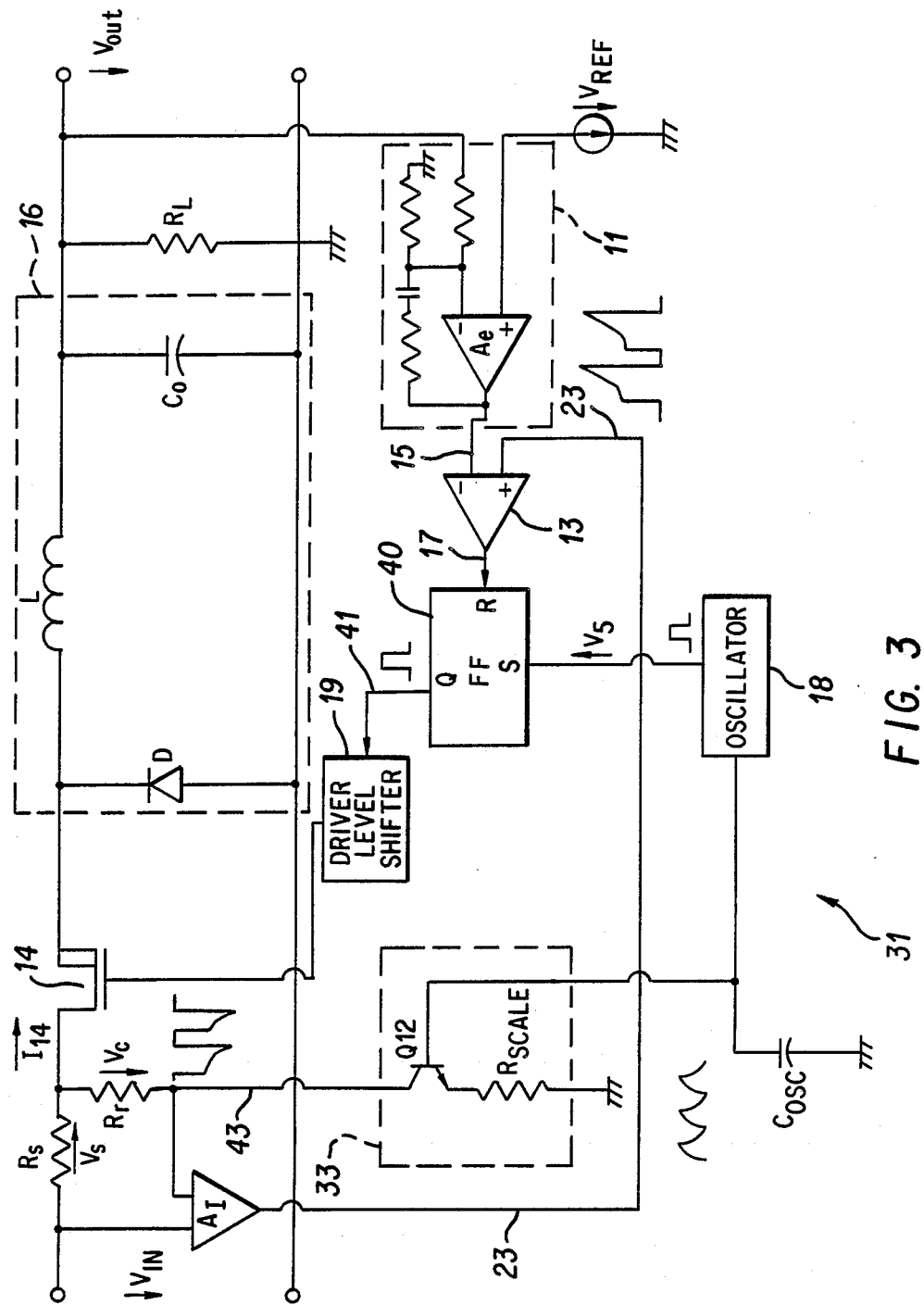
FIG. 3 is a diagram of the buck converter of FIG. 1 having a traditional fixed slope compensating ramp generator circuit.

Referring to FIG. 3, a buck converter circuit 31 with a traditional compensating ramp generator circuit 33 is illustrated. Elements in other embodiment which are similar are referred to with the same reference numerals/names. The transistor Q12 and resistor $R_{scale}$ realize the compensating ramp block 12 and the V to I converter block 42 in FIG. 1. In the circuit 31 $R_r/R_{scale}$ and the slope of the oscillator's timing signal ($V_{COSC}$) set the slope of the compensating ramp voltage $V_c$ having a slope $m_c$. Aside from the disadvantage of generating a compensating ramp voltage $V_c$ having a fixed slope, the circuit 31 has high temperature sensitivity because of the approximately $-0.3\%/°K$. temperature coefficient of the base-emitter voltage of transistor Q12.

Figure 4:
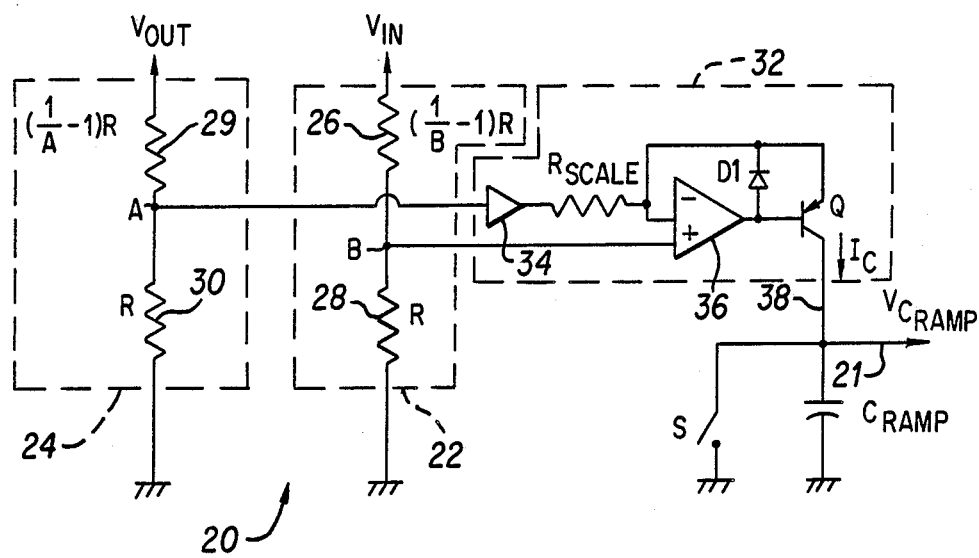
FIG. 4 is a circuit diagram of a ramp generator circuit of the present invention.

Referring to FIG. 4 in conjunction with Table 1, an adaptive circuit 20 for generating a compensating ramp voltage signal ($V_{cramp}$), having a minimum slope, $m_{21}$, where $$m_{21} = \frac{m_c}{g_m * R_r}$$

for most types of DC/DC converters, is illustrated. The circuit 20 generates the optimal compensating ramp signal 21 with the minimum slope $m_{21}$, for a specific type of DC/DC converter by selecting the constants A, B, and C according to Table 1. A and B may be varied so long as A and B are selected so that $m_c$ is equal to or larger than the necessary slope according to Table 1. (i.e., to ensure the stability of the system). C may also be varied to be greater than the value in Table 1. But, the farther A and B deviate from the preferred values of Table 1, the higher the ramp generated and the less current available at current limit because the error amplifier's maximum output voltage is constant.

The adaptive compensating ramp generating circuit 20 is comprised of two voltage dividers 22, 24. The first voltage divider 22 divides an input voltage $V_{IN}$ and the second voltage divider 24 divides an output voltage $V_{OUT}$. For a boost converter, for example, $V_{IN} \leq V_{OUT}$ and for a buck converter, $V_{IN} \geq V_{OUT}$.

The input voltage, $V_{IN}$, is divided by the first voltage divider 22 having two 26, 28 resistors in series: the first resistor 26 has a resistance of $(1/B-1)*R$ ohms and the second resistor 28 has a resistance of R ohms such that the divided voltage at point B is $V_{IN}*B$. Output voltage, $V_{OUT}$, is divided by the second voltage divider 24 having two resistors 29, 30 in series: the first resistor 29 has a resistance of $(1/A-1)*R$ ohms and the second resistor 30 has a resistance of R ohms such that the divided voltage at point A is $V_{OUT}*A$. The divided voltages $A*V_{OUT}$ and $B*V_{IN}$ serve as the two inputs lo to a voltage controlled current source 32 which has two inputs and an output 38.

The voltage controlled current source 32 includes a buffer amplifier 34 connected to a scaling resistor $R_{scale}$ and a feedback loop operational amplifier 36 which is connected between the scaling resistor $R_{scale}$ and a transistor Q, and a diode D1. Since the operational amplifier 36 is a feedback loop amplifier, ideally, it does not consume current, so that the current across the scaling resistor $R_{scale}$ is:

$$I_{RSCALE} = \frac{A * V_{OUT} - B * V_{IN}}{R_{Scale}} \qquad 6$$

The output of the current source 38 is coupled to a capacitor $C_{ramp}$ whose voltage realizes the slope $m_{21}$ of the compensating ramp signal, $V_{cramp}$. The capacitor $C_{ramp}$, is charged through the $I_c$ collector current of the Q transistor. If the transistor Q has a reasonably high $\beta$, $I_c = I_E = I_{RScale}$ (for example, a $\beta$ of about 100 or higher). Resistor $R_{scale}$ controls the rate at which the voltage increases in the capacitor $C_{ramp}$ (ie. the rate at which the capacitor charges up). The slope of the compensating ramp signal 21 having the voltage $V_{cramp}$ is:

$$m_{21} = \frac{I}{C_{ramp}} = \frac{A V_{OUT} - B V_{IN}}{R_{Scale} * C_{ramp}} = \qquad 7$$

$$\frac{1}{R_{Scale} C_{ramp}} (A*V_{OUT} - B*V_{IN})$$

where the constant C in Equation 5 is:

$$C = \frac{1}{R_{Scale} * C_{ramp}} g_m R_r$$

A switch S across the capacitor $C_{ramp}$ discharges capacitor $C_{ramp}$ at the end of each period. The switch S is ON until the start of the next clock period (when the main switch 14 turns ON again) or almost until half of the next clock period has elapsed.

The value of the capacitor $C_{ramp}$, the resistor $R_{Scale}$, $R_r$ and $g_m$, realize the necessary value of the constant C in Eq. 5.

The C constant of Eq. 7 has to be more than equal to the C constant of the converter according to Table 1. For example, for a boost converter, $$\frac{g_m R_r}{R_{Scale} * C_{Ramp}} > \frac{2R_s}{L} \qquad 8$$

Therefore, $$R_{Scale} < \frac{L * g_m R_r}{C_{ramp} * 2R_s}$$

Figure 5:
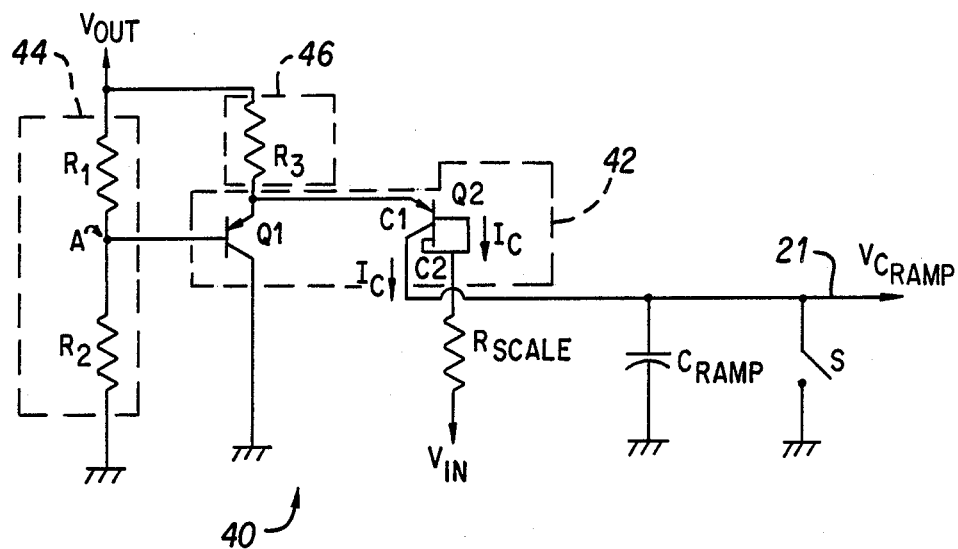
FIG. 5 is circuit diagram of another ramp generator of the present invention for a DC/DC boost converter.

Referring to FIG. 5 and to Table 1, for a DC/DC converter either A or B is 1. Hence, the circuit 20 may be simplified by eliminating the buffer amplifier 34 and the operational amplifier 36 and replacing the amplifier 36 by a single transistor Q2. A compensating ramp generator circuit 40 for a boost converter is illustrated in FIG. 5. The boost ramp generator circuit 40 is based upon the modified general compensating ramp generator circuit 20 of FIG. 4, the general circuit 20 having been modified and simplified to reflect the preferred values of A, B, and C for the boost converter.

In the preferred embodiment, for a boost converter circuit 40, A is about equal to 0.5, B is about equal to 1, and C is about equal to $2 R_s/L$. The boost converter ramp generator circuit 40 has a voltage controlled current source 42 which is comprised of two bipolar transistors Q1, Q2. Transistor Q1 is responsive to the output voltage $V_{OUT}$ and transistor Q2 is responsive to the input voltage $V_{IN}$. In the preferred embodiment, transistor Q1 is a PNP transistor which is used as an emitter follower. Transistor Q1's base is connected to a first voltage divider 44 having a first resistor $R_1$ having a resistance of R ohms, in series with a second resistor $R_2$ having a resistance of R ohms such that the divided voltage at point A is 0.5 $V_{OUT}$.

Transistor Q1's emitter is biased to a first potential $V_{OUT}$ through a resistor $R_3$, with a resistance of R ohms, to ensure that transistor Q1 operates in the linear active region. Transistor Q1's collector is connected to ground.

The second transistor Q2 is a split collector PNP transistor, in the preferred embodiment. Two transistors having their bases and emitters connected together may be used instead of the split collector PNP transistor. The circuit 40 is responsive to the change in current through transistor Q2's multiple collectors C1, C2. Transistor Q2's emitter is connected to transistor Q1's emitter such that transistor Q2's base voltage is also 0.5*$V_{OUT}$. One of Q2's collectors C2 is connected to its base and to a scaling resistor, $R_{scale}$.

Transistor Q2 acts like a current mirror since the current $I_c$ which flows through resistor $R_{scale}$ is mirrored and output to the capacitor $C_{ramp}$. By charging and discharging $C_{ramp}$, by a switch, S, the compensating ramp voltage $V_{cramp}$ is generated.

In a boost converter since B is about 1, the second voltage divider has a division ratio of 1 (i.e., the divider is redundant (non-existent)). Hence voltage $V_{IN}$ is not divided down before being fed to resistor $R_{scale}$. Voltage $V_{IN}$ is connected to transistor Q2 through resistor $R_{scale}$. The resistor $R_{scale}$, capacitor $C_{ramp}$, the split ratio between the two PNP collectors together with $g_m$ and $R_r$ realize the C constant of Eq. 5.

Referring now to FIG. 6a, a compensating ramp generating circuit for a buck converter 50 is illustrated. The buck compensating ramp generator circuit 50 is functionally equivalent to the general compensating ramp circuit 20 of FIG. 4, however the buck ramp circuit 50 having been designed to account for the preferred parameters identified in Table 1. As shown in Table 1, for a buck converter, A is about equal to 1, B is about equal to 0.5, and C is about equal to 2 $R_{scale}/L$.

The buck converter ramp generating circuit 50 is similar to the boost converter compensating ramp circuit 40 in that the buck ramp circuit 50 also has one voltage divider 52, and two bipolar transistors Q3, Q4, a capacitor $C_{ramp}$, and a scaling resistor $R_{scale}$. However, in the buck compensating ramp circuit 50 transistor Q3's emitter is connected to transistor Q4's collector and base.

The voltage divider 52 has a first resistor $R_1$ and a second resistor $R_2$ in series each having a resistance of R ohms. The first voltage divider 52 is connected to a first potential $V_{IN}$ such that the voltage at point B is 0.5*$V_{IN}$. Hence, the voltage into transistor Q3's base is 0.5*$V_{IN}$. Transistor Q3's collector is coupled to $V_{IN}$. Resistor $R_3$ has a resistance of R ohms and it ensures that transistor Q3 operates in the linear active region. Since A is about equal to 1 in a buck converter, voltage $V_{OUT}$ is connected directly to transistor Q4 through resistor $R_{scale}$.

In the preferred embodiment, transistor Q4 is a split collector PNP transistor where one of its collectors C2 is connected to transistor Q3's emitter and also to its base. As previously discussed, two transistors may be used instead of a split collector transistor. The other collector C1 of transistor Q4 is coupled to capacitor $C_{ramp}$. Transistor Q4's emitter is coupled to resistor $R_{scale}$ and transistor Q3's emitter sets the voltage across the resistor $R_{scale}$ and the base-emitter of transistor Q4.

Transistor Q4 acts like a diode and functions like a current splitter. It splits its emitted current, which is set up by $R_{scale}$, $V_{OUT}$, and Q3's emitter voltage, into two equivalent parts: $I_c'$ and $I_c$ (if the split ratio of C1 and C2 is ½ to ½). $I_c'$ charges the capacitor $C_{ramp}$. In this manner, $V_{OUT}$ sets the current in the capacitor $C_{ramp}$ through C1 since the current across resistor $R_{scale}$ is split. Referring now to FIG. 6b, another compensating ramp generator circuit 100, for a buck converter, similar to FIG. 6a, is illustrated. However, the alternate buck circuit 100 accounts for the previously neglected $V_D$ and $V_{SAT}$ terms set forth in Equation 4. Specifically, the alternate buck circuit 100 circuit includes an error voltage $V_e$ 102 where $V_e = V_D + V_{SAT}$. The error voltage source $V_e$ may be implemented using a MOS FET in series with a forward biased diode.

Referring to FIG. 7 a flyback DC/DC converter circuit 70 is illustrated having a compensating ramp generator circuit 20 of the present invention. The filtering component 16 of the flyback circuit 70 includes a transformer 72. The transformer has $n_p$ number of primary turns and $n_s$ number of secondary turns such that $n = n_s/n_p$ (the transformer's turns ratio). In addition, the sense resistor $R_{sense}$ is referenced to ground, the switch's 14 drain is coupled to the primary inductor, and the switch's 14 source is connected to ground through resistor $R_{sense}$. As shown in Table 1, in the compensating ramp generator circuit 20 for a flyback converter for $n > 1$, A is about equal to $1/n$ and B is about equal to 1; for $n < 1$, A is about equal to 1 and B is about equal to n. The circuit 20 may be modified for these preferred parameters.

Referring to FIG. 8, a buck boost DC/DC converter circuit 80 is illustrated having a compensating ramp generator 20 of the present invention. The buck boost circuit 80 is similar to the conventional buck converter circuit 10 illustrated in FIG. 1 but in the buck boost circuit 80 the inductor and the diode change places. As shown in Table 1, for the ramp generator circuit 20 for the buck boost converter, A is about equal to one, B is about equal to 1, and C is about equal to $R_s/L$. Again the ramp generator circuit may be modified for these preferred parameters.

Referring to FIG. 9, a forward DC/DC converter circuit 90 is illustrated having a compensating ramp generator circuit 20 of the present invention. The forward circuit 90 is similar to the FIG. 7 but the filtering component 16 of the forward circuit 90 further includes an inductor, L, 94 and an additional diode D3 in addition to the transformer 92. In the forward circuit 90, the sense resistor $R_{sense}$ is referenced to ground, and the power switch 14 drain is coupled to the transformer 92. The switch's 14 source is also referenced to ground through resistor $R_{sense}$. The transformer 92 has a turns ratio of $n=n_s/n_p$. As shown in Table 1, for the compensating ramp generator circuit 20 for the forward DC/DC converter for n>2: A is about equal to 2/n, B is about equal to 1, and C is about equal to $n^2*R_s/L$. For n<2, A is about equal to 1, B is about equal to n/2, and C is about equal to $2*n*R_s/L$.

Referring to FIG. 10, another circuit diagram of a compensating ramp generator circuit 60 having a multiplier 62 and a constant slope ramp voltage signal 68, is illustrated. The constant slope ramp voltage signal 68 is generated by an oscillator 18, which is present in the switching regulator circuit 10, in conjunction with an energy storage timing element, which in the preferred embodiment is a capacitor $C_{osc}$.

The multiplier 62, which is a differential input multiplier in the preferred embodiment, has two differential input pairs (x1, x2) and (y1, y2) and an output voltage $V_{cramp}$. Input y1 corresponds to the constant slope ramp voltage signal 65. The gain coefficient D of the multiplier 62 is $$D = \frac{C}{m_{osc} * g_m * R_r}$$

where $m_{osc}=$ is the slope of the constant slope voltage signal 68 of the energy storage timing element.
C=is the C constant of Eq. 5

The first pair of multiplier inputs (x1,x2) is connected to a first and a second voltage divider, 64, 66 respectively. The first voltage divider 64, for dividing a first potential $V_{OUT}$, and has two resistors $(1/A-1)*R$ and $R_1$ in series. The divided voltage $V_{OUT}$ at point A is denoted as x2.

The second voltage divider 66, has two resistors $(1/B-1)*R$ and $R_2$, for dividing a second potential $V_{IN}$. Resistors $R_1$ and $R_2$ have substantially the same resistance of R ohms. The divided voltage $V_{IN}$, at point B, is denoted as x1.

One of the second multiplier inputs y1 is connected to the switching regulator circuit 10 oscillator 18 and to the capacitor $C_{osc}$. As previously discussed, $C_{osc}$ generates the constant ramp voltage $V_{osc}$ 68. The other one of the multiplier's second input pairs y2 is connected to a DC reference voltage $V_{ref}$ which generates a threshold voltage $V_{th}$. With voltage $V_{th}$, the starting instant of the compensating ramp can be adjusted. The value of $V_{ref}$ is less than or substantially the same as the average of the ramp voltage out of the multiplier $V_{cramp}$.

Resistor $R_{scale}$ is the gain setting resistor of the multiplier 62 that sets the C constant to the appropriate value. The multiplier 62 takes the difference between the (x1, x2) inputs and the difference between the (y1, y2) inputs and multiplies the differences by the multiplier gain coefficient D to generate a compensating ramp signal $V_{cramp}$.

The multiplier 62 operates only when both differential input voltages (x1, x2) (y1, y1) are positive. Otherwise voltage $V_{cramp}$ is approximately 0. Voltage $V_{cramp}$ is about zero if the differential voltage of either of the input pairs (x1,x2) (y1,y2) is negative.

No compensating ramp is needed when the duty cycle d≦0.5. This means that $V_{th}$ can be set to threshold voltage $V_{th}\leq(V_p-V_v)/2$ or lower. $V_p=$ peak value of the voltage and $V_v$ is the minimum value of the voltage.

Having thus described the invention, it is recognized that those skilled in the art many make various modifications or additions to the preferred embodiment chosen to illustrate the invention without departing from the spirit and scope of the present contribution to the art. Accordingly, it is to be understood that the prosecution sought and to be afforded hereby should be deemed to extend to the subject matter claimed and all equivalents thereof within the scope of the invention.

What is claimed is:

1. A circuit for generating a compensating ramp in a switching regulator of the type which is responsive to an unregulated input voltage ($V_{IN}$) and which provides a regulated output voltage ($V_{OUT}$), having a controlled switching element further having a sense resistor ($R_s$) which provides a signal proportional to the current flowing through the switching element, the signal being used to control the operation of the switching regulator, and means for storing energy having an inductance (L), the compensating ramp circuit comprising:

means for generating a compensating ramp voltage having a slope ($m_c$) which conforms to the equation $$m_c \leq (A*V_o - B*V_{IN})*C$$

where
 A≦1
 B≦1
 C is a constant dependent upon $R_s$, L and magnetic coupling parameters associated with the energy storage means; and
means for superimposing the generated compensating ramp voltage onto the signal from the sense resistor whereby the stability of the switching regulator is maintained.

2. The circuit of claim 1, wherein A, B, C are selected according to the type of switching regulator as follows:

| Switching Regulator | A | B | C |
| --- | --- | --- | --- |
| Buck | 1 | ≦.5 | $2R_s/L$ |
| Boost | ≧.5 | 1 | $2R_s/L$ |
| Buck-Boost | 1 | ≦1 | $R_s/L$ |

3. The circuit of claim 2, wherein the switching regulator has an error voltage ($V_e$) and a saturation voltage ($V_{SAT}$) associated therewith and includes a diode for providing a path to discharge the energy stored in the means for storing energy to an external load when the switching element is off, wherein the diode has a forward biased diode voltage ($V_D$) associated therewith and the error voltage is related to $V_D$ and $V_{SAT}$, such that the compensation ramp voltage is:

$$m_c = (A*V_o - B(V_{IN} - V_e))*C.$$

4. The circuit of claim 3, wherein the error voltage ($V_e$) is set according to the type of switching regulator as follows:

| Switching Regulator | $V_e$ |
|---|---|
| Buck | $\approx [V_D + V_{SAT}]$ |
| Boost | $\approx [V_D + V_{SAT}]$ |
| Buck-Boost | $\approx [V_D + V_{SAT}]$ |
| Flyback (n>1; n<1) | $\approx [V_{D/n} + V_{SAT}]$ |
| Forward (n>2; n<2) | $\approx [2V_{D/n} + V_{SAT}]$ |

5. The circuit of claim 1, wherein the means for storing energy is a transformer having a primary winding of $n_p$ turns, a secondary winding of $n_s$ turns, and a turns ratio of n, where $n = n_s/n_p$, and the inductance of the energy storing means is $L_p$.

6. The circuit of claim 5, wherein A, B, and C are selected according to the type of switching regulator as follows:

| Switching Regulator | | A | B | C |
|---|---|---|---|---|
| Flyback | n < 1 | $\geq 1/n$ | 1 | $R_s/L_p$ |
| | n > 1 | 1 | $\leq n$ | $R_s/nL_p$ |
| Forward | n < 2 | $\geq 2/n$ | 1 | $n^2 R_s/L$ |
| | n > 2 | 1 | $\leq n/2$ | $2nR_s L$ |

7. The circuit of claim 5, wherein the switching regulator is a flyback converter and n is greater than one such that A is greater than 1/n, B is less than or equal to one, and C is greater than or equal to $R_s/L_p$.

8. The circuit of claim 5, wherein the switching regulator is a flyback converter and n is less than one such that A is less than or equal to one, B is less than n, and C is greater than or equal to $R_s/(n*L_p)$.

9. The circuit of claim 5, wherein the switching regulator is a forward converter and n is greater than two such that A is greater than 2/n, B is less than or equal to 1, and C is greater or equal to $n^2*R_s/L$.

10. The circuit of claim 5, wherein the switching regulator is a forward converter and n is less than two such that A is less than or equal to one, B is less than n/2, and C is greater than or equal to $2*n*R_s/L$.

11. The circuit of claim 1, wherein the switching regulator is a buck-boost converter and A is less than or equal to one, B is less than one, and C is greater than or equal to $R_s/L$.

12. The circuit of claim 1, wherein the switching regulator is a buck converter and A is less than or equal to one, B is less than one-half, and C is greater than or equal to $2*R_s/L$.

13. The circuit of claim 1, wherein the switching regulator is a boost converter and A is less than one-half, B is less than or equal to one, and C is greater than or equal to $2*R_s/L$.

14. A method for generating a compensating ramp signal having a slope ($m_c$) in a switching regulator of the type which is responsive to an unregulated input voltage ($V_{IN}$) and which provides a regulated output voltage ($V_{OUT}$), having a sense resistor ($R_s$) which provides a signal proportional to the current flowing through a controlled switching element, the signal being used to control the operation of the switching regulator, and means for storing energy having an inductance (L), comprising the steps of:

(A). generating a first voltage proportional to the output voltage;

(B). generating a second voltage proportional to the input voltage, wherein the proportion for first voltage and the proportion for the second voltage are selected based upon the type of switching circuit;

(C). taking the difference between the first and second voltages and multiplying the difference by a factor determined by $R_s$, L and magnetic coupling parameters associated with the energy storage means to generate the compensating ramp voltage with a slope that is about equal to the multiplied difference; and (D). superimposing the generated compensating ramp voltage onto the signal from the sense resistor whereby the stability of the switching regulator is enhanced.

15. The method of claim 14, wherein the means for storing energy is a transformer having a primary winding of $n_p$ turns, a secondary winding of $n_s$ turns, and a turns ratio of n, where $n = n_s/n_p$, the inductance of the energy storing means is $L_p$, the switching regulator is a flyback converter where n is greater than one, and the first voltage generating so that it is greater than 1/n, the second voltage generating strap in step B includes setting the second voltage in step B so that it is less than or equal to one, and step C includes the step of setting the factor so that it is greater than or equal to $R_s/L_p$.

16. The method of claim 14, wherein the means for storing energy is a transformer having a primary winding of $n_p$ turns, a secondary winding of $n_s$ turns, and a turns ratio of n, where $n = n_s/n_p$, the inductance of the energy storing means is Lp, the switching regulator is a flyback converter where n is less than one, and the first voltage generating step in step A includes setting the first voltage so that it is less than or equal to one, the second voltage generating step B includes setting the second voltage in step B so that it is less than n, and step C includes the step of setting the factor so that it is greater than or equal to $R_s/(n*L_p)$.

17. The method of claim 14, wherein the means for storing energy is an inductor connected to the switching element via a transformer having a primary winding of $n_p$ turns, a secondary winding of ng turns, and a turns ratio of n, where $n = n_s/n_p$, the switching regulator is a forward converter where n is greater than two, and the first voltage generating step in step A includes setting the first voltage so that it is greater than 2/n, the second voltage generating step in step B includes setting the second voltage in step B so that it is less than or equal to one, and step C includes the step of setting the factor so that it is greater than or equal to $n^2*R_s/L$.

18. The method of claim 14, wherein the means for storing energy is an inductor connected to the switching means via a transformer having a primary winding of $n_p$ turns, a secondary winding of $n_s$ turns, and a turns ratio of n, where $n = n_s/n_p$, the switching regulator is a forward converter where n is less than two and the first voltage generating step in step A includes setting the first voltage so that it is less than or equal to one, the second voltage generating step in step B includes setting the second voltage in step B so that it is less than n/2, and step C includes the step of setting the factor so that it is greater than or equal to $2*n*R_s/L$.

19. The method of claim 14, wherein the switching regulator is a buck-boost converter and the first voltage generating step in step A includes setting the first voltage so that it is less than or equal to one, the second voltage generating step in step B includes setting the second voltage in step B so that it is less than one, and step C includes the step of setting the factor so that it is greater than or equal to $R_s/L$.

20. The method of claim 14, wherein the switching regulator has an error voltage ($V_e$) and a saturation voltage ($V_{SAT}$) associated therewith and further includes a diode for providing a path to discharge the energy stored in the means for storing energy to an external load when the switching element is off, wherein the diode has a forward biased diode voltage ($V_D$) associated therewith, the error voltage is related to $V_D$ and $V_{SAT}$, and the step of generating the second voltage in Step (B) includes the step of:

subtracting the error voltage from the input voltage to generate a corrected voltage such that the second voltage is proportional to the corrected voltage.

21. The method of claim 20, wherein the step of generating the corrected voltage includes setting the error voltage according to the type of switching regulation as follows:

| Switching Regulator | $V_e$ |
|---|---|
| Buck | $\approx [V_D + V_{SAT}]$ |
| Boost | $\approx [V_D + V_{SAT}]$ |
| Buck-Boost | $\approx [V_D + V_{SAT}]$ |
| Flyback (n>1; n<1) | $\approx [V_{D/n} + V_{SAT}]$ |
| Forward (n>2; n<2) | $\approx [2V_{D/n} + V_{SAT}]$ |

22. The method of claim 14, wherein the switching regulator is a boost converter and, the first voltage generating step in step A includes setting the first voltage so that it is less than one-half, the second voltage generating step in step B includes setting the second voltage in step B so that it is less than or equal to one, and step C includes the step of setting the factor so that it is greater than or equal to $2*R_s/L$.

23. The method of claim 14, wherein the switching regulator is a buck converter and ,the first voltage generating step in step A includes setting the first voltage so that it is less than or equal to the input voltage, the second voltage generating step in step B includes setting the second voltage in step B so that it is less than half the output voltage, and step C includes the step of setting the factor so that it is greater than or equal to $2*R_s/L$.

24. A circuit for generating a compensating ramp signal in a DC/DC converter, wherein the DC/DC converter receives an input voltage and provides an output voltage; has a sense resistor ($R_s$) which provides a signal proportional to the current flowing through a controlled switching element; and has means for storing energy having an inductance (L), wherein the circuit comprises:

means responsive to the output voltage for providing a first signal which is equal to the output voltage divided by a first preselected amount;

means responsive to the input voltage for providing a second signal which is equal to the input voltage divided by a second preselected amount;

means for generating a charging current proportional to the difference between the first and second signals; and means responsive to the charging current for generating the ramp signal having a slope selected according to the particular type of DC/DC converter.

25. The circuit of claim 24, wherein the means for generating a current is comprised of:

a first transistor means wherein the base of the first transistor means is connected to the means for dividing which is connected to the output voltage, and the emitter of the first transistor means is connected to the output voltage via the second means for dividing; and a second transistor means having at least two collectors, the first collector of the second transistor means is connected to its base and the input voltage via a scaling resistor, the emitter of the second transistor means is connected to the output voltage and to the first transistor means emitter, the other divider is selected so that the input voltage is unchanged, and the second collector provides the proportional current to the means responsive to the current for generating the ramp signal.

26. The circuit of claim 24 wherein the means for generating a current is comprised of:

a first transistor means wherein the base of the first transistor means is connected to one of the means for dividing and the collector of the first transistor means is biased to a first potential and the emitter is biased to a second potential such that the emitter base junction of the first transistor means is forward biased;

a second transistor means having at least two collectors wherein the first collector of the second transistor means is connected to its base and to the first transistor means emitter, the emitter of the second transistor means is connected to a third potential via a scaling resistor, and the second collector of the second transistor means provides the proportional current to the means responsive to the current for generating the ramp signal.

27. The circuit of claim 24, wherein the means for generating a current is comprised of:

a first transistor means wherein the base of the first transistor is connected to the means for dividing which is connected to the input voltage, and the collector of the first transistor is connected to the input voltage; and a second transistor means having at least two collectors, the first collector of the second transistor means is connected to its base and to the first transistor emitter, the emitter of the second transistor means is connected to the other means for dividing which is connected to the output voltage via a scaling resistor, the other divider is selected so that the output voltage is unchanged, and the second collector provides the proportional current to the means responsive to the current for generating the ramp signal.

28. The circuit of claim 27, wherein:
the emitter of the second transistor means is connected to the output voltage through a scaling resistor.

29. The circuit of claim 27, wherein:
the means for generating a ramp signal includes means having a capacitance which is a function of L, and $R_s$; and
the ramp signal is the voltage produced across the means having a capacitance when the proportional current is used to charge the capacitance means.

30. The circuit of claim 24 wherein the means for generating a current is comprised of:

a first transistor means wherein the base of the first transistor means is connected to one of the means for dividing, the emitter of the first transistor means is biased to a first potential, and the collector is connected to a second potential such that the emitter base junction of the first transistor means is forward biased and the collector base junction is reverse biased; and a second transistor means having at least two collectors wherein the first collector of the second transistor means is connected to its base, the emitter of the second transistor means is connected to the emitter of the first transistor means, and the first collector of the second transistor means is connected to the other means for dividing via a scaling resistor, and the second collector of the second transistor means provides the proportional current to the means responsive to the current for generating the ramp signal.

31. The circuit of claim 24, wherein:
the first preselected amount is $\leq 1$ and the second preselected amount is $\leq 1$.

32. The circuit of claim 24, wherein the means voltage controlled current source.

33. The circuit of claim 24, wherein the means responsive to the current includes a capacitive element having a value which is a function of $R_s$, and L.

34. A method for designing a compensating ramp signal having a slop ($m_c$) in a switching regulator of the type which is responsive to an unregulated input voltage ($V_{IN}$) and which provides a regulated output voltage ($V_{OUT}$), having a sense resistor ($R_S$) which provides a signal proportional to the current flowing being used to control the operation of the switching regulator, and means for storing energy having an inductance (L), comprising the steps of:

(A). generating a first voltage proportional to the output voltage;

(B). generating a second voltage proportional to the input voltage, wherein the proportion for the first voltage and the proportion for the second voltage are selected based upon the type of switching circuit;

(C). taking the difference between the first and second voltages and multiplying the difference by a factor determined by $R_s$, L and magnetic coupling parameters associated with the energy storage means to generate the compensating ramp voltage with a slope that is about equal to the multiplied difference; and (D). superimposing the generated compensating ramp voltage onto the signal from the sense resistor whereby the stability of the switching regulator is enhanced.

35. The method of claim 34, wherein the means for storing energy is a transformer having a primary winding of $n_p$ turns, a secondary winding of $n_g$ turns, and a turns ratio of n, where $n=n_s/n_p$, the inductance of the energy storing means is $L_p$, the switching regulator is a flyback converter where n is less than one, and the first voltage generating step in step A includes setting the first voltage so that it is less than or equal to one, the second voltage generating step in step B includes setting the second voltage in step B so that it is less than n, and step C includes the step of setting the factor so that it is greater than or equal to $R_s/(n*L_p)$.

36. The method of claim 34, wherein the means for storing energy is an inductor connected to the switching element via a transformer having a primary winding of $n_p$ turns, a secondary winding of $n_s$ turns, and a turns ratio of n, wherein $n=n_s/n_p$, the switching regulator is a forward converter where n is greater than two, and the first voltage generating step in step A includes setting the first voltage so that it is greater than 2/n, the second voltage generating step in step B includes setting the second voltage in step B so that it is less than or equal to one, and step C includes the step of setting the factor so that it is greater than or equal to $n^2*R_s/L$.

37. The method of claim 34, wherein the means for storing energy is an inductor connected to the switching means via a transformer having a primary winding of $n_p$ turns, a secondary winding of $n_s$ turns, and a turns ratio of n, where $n=n_s/n_p$, the switching regulator is a forward converter where n is less than two and the first voltage generating step in step A includes setting the first voltage so that it is less than or equal to one, the second voltage generating step in step B includes setting the second voltage in step B so that it is less than n/2, and step C includes the step of setting the factor so that it is greater than or equal to $2*n*R_s/L$.

38. The method of claim 34, wherein step in step B includes setting the second voltage in step B so that it is less than one, and step C includes the step of setting the factor so that it is greater than or equal to $R_s/L$.

39. The method of claim 34, wherein the means for storing energy is a transformer having a primary winding of $n_p$ turns, a secondary winding of $n_s$ turns, and a turns ratio of n, where $n=n_s/n_p$, the inductance of the energy storing means is $L_p$, the switching regulator is a flyback converter where n is greater than one, and the first voltage generating step in step A includes setting the first voltage so that it is greater than 1/n, the second voltage generating step in step B includes setting the second voltage in step B so that it is less than or equal to one, and step C includes the step of setting the factor so that it is greater than or equal to $R_s/L_p$.

40. The method of claim 34, wherein the switching regulator is a boost converter and, the first voltage generating step in step A includes setting the first voltage so that it is less than one-half, the second voltage generating step in step B includes setting the second voltage in step B so that it is less than or equal to one, and step C includes the step of setting the factor so that it is greater than or equal to $2*R_s/L$.

41. The method of claim 34, wherein the switching regulator is a buck converter and, the first voltage generating step in step A includes setting the first voltage so that it is less than or equal to the input voltage, the second voltage generating step in step B includes setting the second voltage in step B so that it is less than half the output voltage, and step C includes the step of setting the factor so that it is at least equal to $2*R_s/L$.

42. A circuit for generating a compensating ramp voltage in a DC/DC converter, the circuit receives an input voltage and an output voltage from the converter wherein the circuit comprises:

means for dividing the output voltage by a first preselected amount;

means for dividing the input voltage by a second preselected amount;

means for generating a current proportional to the difference between the divided input voltage and the output voltage; and means for multiplying the difference of the first divided input voltage and the divided output voltage with a fixed slope ramp voltage, to generate the compensating ramp signal.

* * * * *

UNITED STATES PATENT AND TRADEMARK OFFICE
CERTIFICATE OF CORRECTION

PATENT NO. : 4,975,820

DATED : DECEMBER 4, 1990

INVENTOR(S): TAMAS S. SZEPESI

It is certified that error appears in the above - identified patent and that said Letters Patent is hereby corrected as shown below:

In Col. 10, line 31, delete "$m_c<(A*V_o-B*V_{IN})*C$" and replace with --$m_{\underline{c}}>(A*V_o-B*V_{IN})*C$--.

In Col. 10, line 62, delete "compensation" and replace with --compensating--.

In Col. 11, line 20, after "Flyback" delete "$n<1$" and replace with --$n>1$--.

In Col. 11, line 21, delete "$n>1$" and replace with --$n<1$--.

In Col. 11, line 22, after "Forward" delete "$n<2$" and replace with --$n>2$--.

In Col. 11, line 23, delete "$n>2$" and replace with --$n<2$--.

In Col. 11, line 36, after "greater" insert --than--.

In Col. 12, line 18, after "generating" insert --step in step A includes setting the first voltage--.

UNITED STATES PATENT AND TRADEMARK OFFICE
CERTIFICATE OF CORRECTION

PATENT NO. : 4,975,820

DATED : DECEMBER 4, 1990

INVENTOR(S): TAMAS S. SZEPESI

It is certified that error appears in the above - identified patent and that said Letters Patent is hereby corrected as shown below:

In Col. 12, line 19, delete "strap" and replace with --step--.

In Col. 12, line 31, after "step" insert --in step--.

In Col. 12, line 38 delete "ng" and replace with --$n_s$--.

In Col. 15, line 17, after "means" insert --for generating the proportional charging current is a--.

In Col. 15, line 27, after "flowing" insert --through a controlled switching element, the signal--.

In Col. 15, line 51, delete "ng" and replace with --$n_s$--.

In Col. 16, line 19, after "wherein" insert --the switching regulator is a buck-boost converter and--.

UNITED STATES PATENT AND TRADEMARK OFFICE
CERTIFICATE OF CORRECTION

PATENT NO. : 4,975,820

DATED : DECEMBER 4, 1990

INVENTOR(S) : TAMAS S. SZEPESI

It is certified that error appears in the above-indentified patent and that said Letters Patent is hereby corrected as shown below:

In Col. 16, line 19, after "wherein" insert --the switching regulator is a buck-boost converter and--.

Signed and Sealed this

Thirty-first Day of May, 1994

Attest:

BRUCE LEHMAN

Attesting Officer

Commissioner of Patents and Trademarks